2,756,156

RUSTPROOFING COMPOSITIONS

Malvern J. Hiler, Dayton, Ohio, assignor to The Commonwealth Engineering Company of Ohio, Dayton, Ohio, a corporation of Ohio No Drawing. Application April 15, 1954,
Serial No. 423,543

13 Claims. (Cl. 106—14)

This invention relates to new anti-corrosion agents and compositions comprising them, said agents and compositions being adapted to protect ferrous and other metal surfaces to which they are applied from rusting and other types of corrosion.

As is well known there is a demand for rust inhibitors which are wholly organic in character. Aside from hydrocarbon oils, however, very few organic substances are known having both satisfactory adherence to metal and satisfactory rust inhibiting properties, and inorganic materials such as sodium dichromate or zinc chromate are used. As is well known, simple hydrocarbon oil films have the disadvantage of affording only limited protection to metal surfaces against rusting and other types of corrosion, and in general cannot be relied on to provide such protection in the presence of moisture or even under conditions merely of high humidity.

One object of the present invention is to provide new anti-corrosion agents which are highly hydrophobic in character and thus both adhere tenaciously to metal and protect the metal against rusting at high humidities and in the presence of moisture.

Another object is to provide new anti-corrosion agents which may be used in lubricating oil compositions to be employed in the presence of large quantities of moisture and moisture vapor, e. g., steam turbine lubricating oil compositions.

Other objects will be apparent from the following detailed description of the invention and various advantages not specifically referred to herein will become obvious to those skilled in the art upon employment of the invention in practice.

The objects mentioned, and others, are attained by the use of esters of dextran or suitable low-substituted dextran derivatives with saturated fatty acids of from 8 to 18 carbon atoms.

The esters are obtained by reacting the dextran or low-substituted dextran with an esterifying derivative of the saturated fatty acid, and preferably with a halide such as the chloride thereof, in the presence of an acid acceptor or binding agent such as an organic base, as for instance a tertiary heterocyclic amine of the type of quinoline, pyridine, N-methyl morpholine, etc., and in the presence of a substance in which the reaction product is at least partially solvated, that is dissolved or swollen, as it is formed during the reaction. This results in the reaction product being maintained in highly swollen or dissolved state and thus insures substantially uniform, homogeneous reaction between the dextran and esterifying agent. Substances which dissolve or swell the ester as it is formed are, for example, xylene, toluene, dioxane, etc. In general, the reaction is carried out at temperatures between 100° C. and 155° C. for time periods varying inversely with the temperature between a half hour and three hours, both the temperature and the reaction time depending on the boiling point of the mixture of acid acceptor and solvating agent used. Thus, if a mixture of quinoline and xylene is used, the reaction may be effected by heating the mass at 150 to 155° C. from one-half hour to an hour; if mixed pyridine and toluene of relatively low boiling point is used, the reaction is preferably run at temperatures of 100° C. to 115° C. for one to three hours.

The dextran ester is recovered from the crude reaction mixture, in which it is at least partially dissolved, by washing the mixture with water to remove the hydrochloride of the organic base, e. g., pyridine hydrochloride or quinoline hydrochloride, removing the aqueous layer, adding a solvent for the ester to the residual mass, and precipitating the ester by adding the solution to a non-solvent for the ester, such as a lower aliphatic alcohol, e. g., methanol, ethanol, isopropanol, etc., and filtering the ester which may be further purified by re-precipitation, if desired, and dried.

In another embodiment, the fatty acid radical is introduced into the dextran molecule by reacting the dextran or low-substituted dextran containing free hydroxyl groups with the selected saturated fatty acid, in the presence of an impeller which may be a monohalogenated monobasic organic acid anhydride and an esterification catalyst such as magnesium perchlorate at temperatures at which the reaction mixture remains in the liquid state and which depend on the acid and dextran or substituted dextran used but which are, in general, in the range between 50° C. and 100° C., and for a time varying inversely with the temperature between one-half hour and two hours. The ester is isolated from the crude reaction mass by cooling the mass, dissolving it in a solvent therefor, and precipitating it into a non-solvent for the ester in which the chloracetic acid formed by the addition of by-product water from the reaction to the anhydride impeller remains in solution, and filtering to remove the ester which is then dried in any suitable manner.

The saturated acids which may be used in the free acid condition or in the form of their chlorides are those containing from 8 to 18 carbon atoms, including caprylic, pelargonic, capric, undecylic, lauric, tridecylic, myristic, pentadecylic, palmitic, margaric and stearic acids, and the corresponding chlorides. Two or more of the substantially pure acids, or chlorides thereof, may be used, resulting in the production of mixed esters. Or commercial acids, which comprise mixtures, may be used. For example, there may be used commercial or technical grade stearic acid which is a mixture of stearic and palmitic acids, to produce the mixed ester dextran stearate-palmitate.

These dextran esters are strongly hydrophobic which insures tenacious adherence thereof to ferrous and other metals.

The fatty acid or its chloride is used in amounts varying between less than 1.0, e. g., 0.5 and 10 parts thereof by weight per each part by weight of the dextran or low-substituted dextran derivative for reaction times and at reaction temperatures generally inversely related to the relative proportions of the reactants, to produce esters containing an average of from less than 1.0 up to 3.0 of the saturated fatty acid radicals per anhydrogluco-pyranosidic unit. The preferred products for the present purposes are those esters containing from 2.0 to 3.0 of fatty acid radicals derived from the fatty acids of the higher carbon content, that is the 12–18 carbon acids. The esters may be applied to the metal object to be protected in the form of aqueous emulsions or dispersions or in solution in halogenated hydrocarbons such as chloroform, carbon tetrachloride and "Freons" (commercially available chlorofluoro-methanes of the type of "Freon 11," a trichloro-monofluoromethane and "Freon 12," a dichlorodifluoromethane) and in the common organic solvents of the type of benzene, toluene and the xylenes.

The dextran esters are also adapted to inclusion in oil compositions of various types having special properties adapting them to certain particular uses. They may be lubricating oil compositions ranging from light machine and household oils to heavy lubricants for large internal combustion engines including diesel engines. Alternatively, they may be of the nature of protective oils or greases, such as slushing oils or gun greases, or they may be adapted for use as cutting oils and the like. Oil compositions including the dextran esters are suited for use as steam turbine oils since they provide adequate protection against rusting and corrosion in the presence of relatively large quantities of water and water vapor. They may also be fuel oil compositions, including diesel engine fuel and domestic burner oils, whereby the anti-corrosion action of the hydrophobic dextran ester protects the tanks in which such oil is stored against corrosion brought about by the water with which such oils are often contaminated, as for instance in the case of marine fuel oils which usually are contaminated with salt water giving rise to serious corrosion in the storage bunkers.

When the dextran esters are included in oil compositions, the compositions may be prepared by mixing the ester with the selected hydrocarbon oil base. The compositions may also include other usual oil adjuvants such as anti-oxidants, detergents, bearing corrosion inhibitors, viscosity index improvers, demulsifying agents, anti-foam agents, pour point depressors, etc. The proportion of the dextran ester in the oil composition may vary depending on the severity of the corrosion conditions under which the compositions will be used. In general, however, lubricating compositions may contain less than 1.0% as between about 0.01 and about 0.5% of the dextran ester, based on the weight of the base oil, and slushing oil type compositions may contain up to 10% or more by weight of the dextran ester to provide excellent protection against corrosion even under drastic climatic conditions.

The dextran ester may be obtained by esterification of dextran produced in any suitable way, as by inoculating a sucrose-bearing culture medium with a microorganism of the *Leuconostoc mesenteroides* or *Leuconostoc dextranicum* types, and holding the mass until the dextran is biosynthesized in maximum yield, the biosynthesis taking place in the presence of the bacteria and cellular debris. Or the microorganism may be cultivated to produce the enzyme dextransucrase which is separated by filtration and introduced into the sucrose-bearing medium. The native dextran may be used and may be readily water-soluble, difficultly water-soluble or substantially water-insoluble, and may be obtained using the microorganisms (or their enzymes) bearing the following NRRL (Northern Regional Research Laboratory) classifications: *Leuconostoc mesenteroides* B–512, *L. m.* B–119, B–1146, B–1190, B–742, B–1181, B–1196, B–1208, B–1216, B–1120, B–1144 or B–523, *Streptobacterium dextranicum* B–1254 or *Betabacterium vermiforme* B–1139. Instead of esterifying the dextran in its native state, it may be partially hydrolyzed in any appropriate manner, as by means of acid or enzymically, to dextran segments of lower molecular weight, and then reacted with the saturated fatty acid or chloride thereof.

The following examples will illustrate specific embodiments of the invention but are not to be construed as limiting the same.

Example I

Dextran palmitate (derived from *L. m* B–512 native dextran) containing an average of 2.9 palmitoyl groups of anhydroglucopyranosidic unit is dissolved to 10% concentrations in carbon tetrachloride. The solution is applied to the surface of a ferrous metal object and the solvent is allowed to evaporate. The palmitate forms a firmly adherent, hydrophobic film on the surface which film is wholly organic and resistant to corrosion. Exposure of the surface to high humidity and to direct contact with salt water does not result in the development of rust spots.

Example II

Dextran stearate (derived from B–523 native dextran) containing an average of 2.9 stearoyl groups per anhydroglucopyranosidic unit is dissolved to 8% concentration in chloroform. The solution is applied to the surface of a ferrous metal article and the solvent evaporated. High humidity and exposure to direct contact with salt water of the article carrying the strongly hydrophobic firmly adherent dextran stearate film failed to result in the development of rust spots.

Example III

About 3.0% of the B–523 dextran palmitate having an average palmitoyl content of 2.9 palmitoyl radicals per anhydroglucopyranosidic unit is mixed with a refined mineral lubricating oil having the specifications: Gravity API: 31.5–33.5; viscosity at 100° F. SUV: 145–155; viscosity at 210° F. FSUV: 43 minimum; viscosity index: 107; color: 1.0–1.5; flash point ° F.: 400; fire point ° F.: 450.

This composition passes the "ASTM corrosion test" as specified in the "ASTM standards on petroleum products and lubricants," September 1945, and designated as ASTM D–665–44T. In brief, this test consists in placing a 300 ml. sample of the oil-dextran ester composition and 10 ml. of distilled water in a 400 ml. glass beaker which is immersed in a constant temperature bath maintained at 140° F. The beaker is fitted with a cover provided with openings for a stainless steel motor-driven stirrer and for insertion of a standard steel test bar ½ inch in diameter and 5½ inches long, which is cleaned and polished just prior to the test. The stirrer is started and when the oil sample in the beaker reaches a steady temperature of 140° F. the test bar is inserted in the proper opening and hangs suspended from the beaker cover. Stirring is continued for 48 hours, after which the test bar is removed and examined for rust spots. The presence of any rust spots on the bar indicates failure to pass the test. No rust spots are detected on the bar immersed in the mineral oil-dextran palmitate composition.

Other dextran esters within the scope of this invention give similar results although as has been indicated previously the esters of the fatty acids of 12–18 carbon content and containing an average of 2.0 to 3.0 of the ester groups per anhydroglucopyranosidic unit are preferred.

It has been indicated that esters of the saturated 8–18 carbon acids with initially low-substituted dextrans may be used as corrosion inhibitors for the ferrous and other metals. Low-substituted dextrans, that is dextran containing, initially, some free hydroxyl groups and substituent groups other than saturated fatty acid radicals, such as carboxyalkyl dextran in which the alkyl radical contains 1–5 carbons and particularly carboxymethyl dextran, benzyl dextran, and dextran lower fatty acid radicals such as dextran acetate. For optimum results, in these initially substituted dextrans containing other substituent groups, the proportion of the latter should not be above an average of 1.0 such group per anhydroglucopyranosidic unit, the minimum average D. S. with respect to the 8–18 saturated fatty acid radicals being at least 2.0. As previously stated, the more highly substituted esters of dextran with the fatty acids of higher carbon content are preferred for use as such or in oil-containing compositions, dextran palmitate and dextran stearate containing an average of about 3.0 palmitoyl or stearoyl radicals being particularly preferred.

It will be understood that various esters within the broader range given may be substituted in the detailed examples, and in proportions other than stated. In general the esters are used in amounts between 0.1 and 20%, those esters of the acids having shorter chains and lower carbon content being usually used in the higher amounts. In the compositions comprising oil, the oil is normally present in major amount and the ester of dextran or substituted dextran is present in minor amount.

This and other changes and modifications may be made in practicing the invention without departing from the terms of the disclosure or the spirit and scope of the appended claims.

What is claimed is:

1. An improved hydrocarbon oil composition comprising a major amount of a hydrocarbon oil and a minor amount of an ester of a saturated fatty acid of from 8 to 18 carbon atoms with a substance selected from the group consisting of dextran and initially low-substituted dextrans in which the substituent groups initially present are groups other than those derived from said saturated fatty acids and present in an average proportion not greater than about 1.0 such group per anhydroglucopyranosidic unit, the amount of the dextran or initially low-substituted dextran ester being sufficient to impart corrosion-resistant properties to the composition.

2. An improved hydrocarbon oil composition comprising a major amount of a hydrocarbon oil and a minor amount of an ester of native, high molecular weight, microbiologically produced dextran with a saturated fatty acid of from 8 to 18 carbon atoms containing an average of from 2 to 3 of the saturated fatty acid radicals per anhydroglucopyranosidic unit, the amount of the dextran ester being sufficient to impart corrosion-resistant properties to the composition.

3. An improved hydrocarbon oil composition comprising a major amount of a hydrocarbon oil and a minor amount of a palmitate of native, high molecular weight, microbiologically produced dextran containing an average of 2 to 3 palmitoyl groups per anhydroglucopyranosidic unit of the dextran, the amount of the dextran ester being sufficient to impart corrosion-resistant properties to the composition.

4. An improved hydrocarbon oil composition comprising a major amount of a hydrocarbon oil and a minor amount of a palmitate of native, high molecular weight, microbiologically produced dextran containing an average of about 3 palmitoyl groups per anhydroglucopyranosidic unit of the dextran, the amount of the dextran ester being sufficient to impart corrosion-resistant properties to the composition.

5. An improved hydrocarbon oil composition comprising a major amount of hydrocarbon oil and a minor amount of a stearate of native, high molecular weight, microbiologically produced dextran containing an average of 2 to 3 stearoyl groups per anhydroglucopyranosidic unit of the dextran, the amount of the dextran ester being sufficient to impart corrosion-resistant properties to the composition.

6. An improved hydrocarbon oil composition comprising a major amount of hydrocarbon oil and a minor amount of a stearate of native, high molecular weight, microbiologically produced dextran containing an average of about 3 stearoyl groups per anhydroglucopyranosidic unit of the dextran, the amount of the dextran ester being sufficient to impart corrosion-resistant properties to the composition.

7. The method of rustproofing articles of ferrous and other metals subject to corrosion which comprises applying thereto a composition comprising, as hydrophobic, film-forming rustproofing component, an ester of a saturated fatty acid of from 8 to 18 carbon atoms with a substance selected from the group consisting of dextran and initially low-substituted dextrans in which the substituent groups initially present are other than groups derived from said saturated acids and present in an amount of not more than an average of about 1.0 such group per anhydroglucopyranosidic unit.

8. The method of rustproofing articles of ferrous and other metals subject to corrosion which comprises applying thereto a composition comprising, as hydrophobic, film-forming rustproofing component, a palmitate of native, high molecular weight, microbiologically produced dextran containing, per anhydroglucopyranosidic unit, an average of 2 to 3 palmitoyl groups.

9. The method of rustproofing articles of ferrous and other metals subject to corrosion which comprises applying thereto a composition comprising as hydrophobic, film-forming rustproofing component, a stearate of native, high molecular weight, microbiologically produced dextran containing, per anhydroglucopyranosidic unit, an average of 2 to 3 stearoyl groups.

10. The method of rustproofing articles of ferrous and other metals subject to corrosion which comprises applying thereto a composition comprising a major amount of a hydrocarbon oil and a minor amount, sufficient to impart corrosion-resistance to the composition, of an ester of native, high molecular weight, microbiologically produced dextran with a saturated fatty acid of from 8 to 18 carbon atoms containing, per anhydroglucopyranosidic unit, an average of 2 to 3 of the saturated fatty acid groups.

11. Rustproof articles of ferrous and other metals subject to corrosion, said articles having firmly adhered thereto and being rustproofed by an ester of a saturated fatty acid of from 8 to 18 carbon atoms with a substance selected from the group consisting of dextran and initially low-substituted dextrans in which the substituent groups present initially are other than groups derived from said saturated fatty acids and are present in an amount not greater than an average of about one such group per anhydroglucopyranosidic unit.

12. Rustproof articles of ferrous and other metals subject to corrosion, said articles having firmly adhered thereto and being rustproofed by a palmitate of native, high molecular weight, microbiologically produced dextran containing, per anhydroglucopyranosidic unit, an average of 2 to 3 palmitoyl groups.

13. Rustproof articles of ferrous and other metals subject to corrosion, said articles having firmly adhered thereto and being rustproofed by a stearate of native, high molecular weight, microbiologically produced dextran containing, per anhydroglucopyranosidic unit, an average of 2 to 3 stearoyl groups.

References Cited in the file of this patent

UNITED STATES PATENTS

| | | |
|---|---|---|
| 2,503,623 | Luaces | Apr. 11, 1950 |
| 2,672,444 | Wasson et al. | Mar. 16, 1954 |
| 2,674,584 | Deniston | Apr. 6, 1954 |